(12) United States Patent
Huberman et al.

(10) Patent No.: US 7,644,146 B2
(45) Date of Patent: Jan. 5, 2010

(54) SYSTEM AND METHOD FOR DISCOVERING COMMUNITIES IN NETWORKS

(75) Inventors: Bernardo Huberman, Palo Alto, CA (US); Fang Wu, Stanford, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 1113 days.

(21) Appl. No.: 10/859,578

(22) Filed: Jun. 2, 2004

(65) Prior Publication Data

US 2006/0080422 A1   Apr. 13, 2006

(51) Int. Cl.
*G06F 15/173* (2006.01)
*G06F 7/00* (2006.01)
*G06F 17/30* (2006.01)

(52) U.S. Cl. ............................. 709/223; 707/5; 707/6; 707/7

(58) Field of Classification Search ........................ None
See application file for complete search history.

(56) References Cited

U.S. PATENT DOCUMENTS

| | | | |
|---|---|---|---|
| 5,185,860 A | 2/1993 | Wu | |
| 5,276,789 A | 1/1994 | Besaw et al. | |
| 5,438,621 A | 8/1995 | Hornak et al. | |
| 5,490,007 A | 2/1996 | Bennett et al. | |
| 5,568,470 A | 10/1996 | Ben-Nun et al. | |
| 5,809,340 A | 9/1998 | Bertone et al. | |
| 6,055,225 A | 4/2000 | Wu | |
| 6,055,286 A | 4/2000 | Wu et al. | |
| 6,311,152 B1 | 10/2001 | Bai et al. | |
| 6,381,607 B1 | 4/2002 | Wu et al. | |
| 6,397,181 B1 | 5/2002 | Li et al. | |
| 6,674,861 B1 | 1/2004 | Xu et al. | |
| 6,678,389 B1 | 1/2004 | Sun et al. | |
| 6,701,026 B1 | 3/2004 | Zheng et al. | |
| 6,707,933 B1 | 3/2004 | Mariani et al. | |
| 6,892,178 B1 * | 5/2005 | Zacharia ...................... 705/10 |
| 6,947,966 B1 * | 9/2005 | Oko et al. ................... 709/203 |
| 2004/0062424 A1 | 4/2004 | Mariani et al. | |
| 2004/0249811 A1 * | 12/2004 | Shostack et al. ............... 707/5 |

OTHER PUBLICATIONS

D. Wilkinson and B.A. Huberman, A method for finding communities of related genes, Proc. Natl. Acad. Sci. USA, vol. 101, suppi. 1, 5241-5248 (Apr. 6, 2004).

J. Tyler, D. Wilkinson, and B. A. Huberman, "Email as Spectroscopy: Automated Discovery of Community Structure within Organizations," Communities and Technologies, M. Huysman, E. Wegner and V. Wulf, eds. Kluwer Academic (Aug. 31, 2003).

(Continued)

*Primary Examiner*—John B. Walsh (57) ABSTRACT

The disclosed embodiments relate to a system and method for discovering communities in networks. The system and method may include selecting a plurality of nodes from a network of nodes to serve as poles, setting weight values for the poles, applying a community-discovering algorithm based on the weight values, and dividing the network into communities based on a result obtained from the community-discovering algorithm.

13 Claims, 9 Drawing Sheets

OTHER PUBLICATIONS

Boris Rabinovich and Anna Rapoport, Graphs, Geometry and Probability, Lecture 7 (Mar. 2003).

M.E.J. Newman and M. Girvan, Finding and evaluating community structure in networks, cond-matl0308217 (Aug. 11, 2003).

M. Girvan and M.E.J. Newman, Community structure in social and biological networks, Proc. Natl. Acad. Sci, USA vol. 99, No. 12, 7821-7826 (Jun. 11, 2002).

W. W. Zachary, An information flow model for conflict and fission in small groups, Journal of Anthropological Research, vol. 33! 452-473 (1977).

M.E.J. Newman, Fast algorithm for detecting community structure in networks, Department of Physics and Center for the Study of Complex Systems, University of Michigan, Ann Arbor, MI (Sep. 22, 2003).

* cited by examiner

SYSTEM AND METHOD FOR DISCOVERING COMMUNITIES IN NETWORKS

BACKGROUND

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

A community may be any cluster or group of nodes within a network or graph wherein the nodes are more connected to one another than to a different set of nodes within the network or graph. Further, a network or graph may be a structure such as a complex gene network, a social network, a business organization, interlinked data, or a computer network. More generally, a network or graph may be defined as any group of nodes containing nodes interconnected by edges, wherein an edge may be a line representing a commonality between two or more nodes, such as a communication or a shared characteristic. For example, a network or graph may be an informal social network wherein nodes are individual persons connected by communication patterns and wherein smaller communities are embedded within the larger network. In another example, a network or graph may be an organization wherein the nodes are individuals within the organization that link together by e-mail communications.

Information regarding these network/graph embedded communities may be extracted using techniques for defining and studying networks or graphs of linked nodes. Specifically, these techniques may provide the ability to define communities within the network and may even indicate certain node characteristics (e.g. determine which individual person in an organization is a group leader). In general a community may be defined as a cluster of entities with commonalities forming a unit within a larger unit. Identifying communities, however, may be hampered because it may be difficult to identify a relationship between nodes in a large or complex network. It may take a relatively long time to identify and uncover the membership of communities in such a network.

Existing methods for discovering communities require algorithms that do not scale well with the size of the network or graph containing the communities. For example, in utilizing some methods, finding communities may require an amount of time that is of the order of the fourth power of the number of nodes in a network or graph. Thus, the existing methods may become very slow when operating on large networks or graphs which may even have an undefined structure that is essentially infinite. While there are some heuristics that exhibit performance times that are linear with the size of the graph or network, they may not allow for discovering the community around a single node without solving the whole problem.

DETAILED DESCRIPTION

One or more specific embodiments of the present invention will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The presently disclosed technique may facilitate discovering communities embedded within networks, which may be referred to as graphs, of arbitrary size. This disclosed system and method may facilitate the discovery of communities in times that scale linearly with the size of the network or graph. The disclosed embodiments may employ a community discovering algorithm comprising an electrical analogy algorithm. More specifically, disclosed embodiments may employ a voltage analogy algorithm where conceptual voltage drops across large networks define communities. Thus, the disclosed embodiments may focus on communities themselves and not on their hierarchical structures. These easily solved voltage drops may be utilized to define communities in times that scale linearly with their size (O(V+E)), where O represents order, V represents vectors, and E represents edges. Moreover this technique or algorithm may avoid edge cutting and may allow for the swift discovery of communities around a given node without having to first solve the whole community structure and without having to extract all the communities out of a graph or network.

A community may be defined by edges between nodes within a network. As discussed above, an edge may be a line between two or more nodes that represents a connection between the nodes, such as a communication or a shared characteristic. Accordingly, unveiling or discerning community structure within a network may mean that a graph or network can be divided into groups so that edges appear within a group much more often than across two groups. However, this definition of community is problematic if a node connects two clusters that have about the same number of edges. In such a case, it becomes hard to tell to which cluster the node belongs. Furthermore, large graphs or networks often possess a hierarchical community structure and hence the number of communities in a graph may depend on the level at which the graph is being partitioned.

The unveiling of community structures within networks may be beneficial because it may facilitate observation and utilization of information within networks and graphs. For example, discernment of community structures may enable the investigation of information flow within an organization, the discovery of causal effects in a complex gene network, and the discovery of the dynamics of virus propagation in computer networks. The discernment of community structure may even provide a means to expose the leaders of a community. Further, as mentioned above, the utilization of certain techniques and algorithms may facilitate the defining of communities and the comprehension of community structures.

Figure 1:
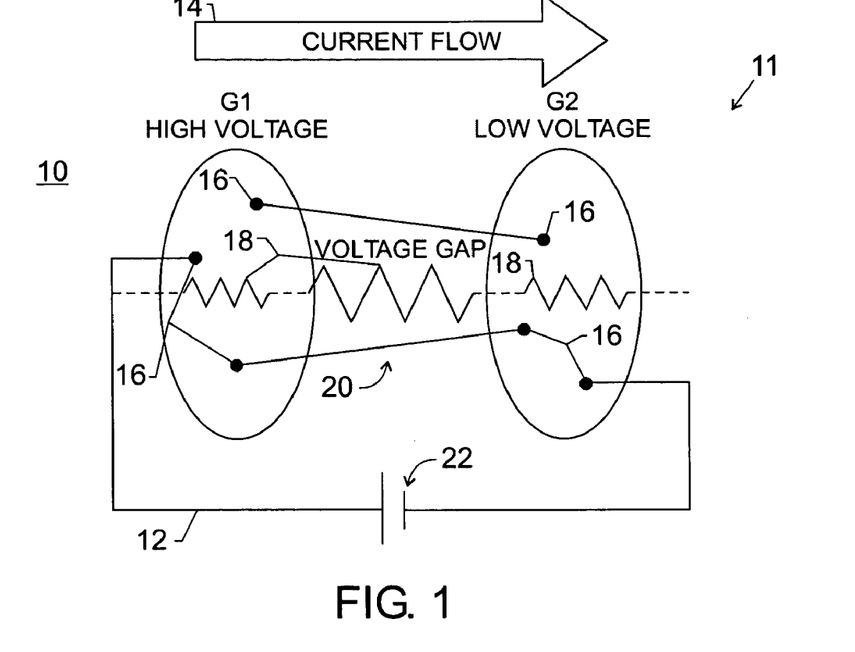
FIG. 1 is a diagram that illustrates the concept of modeling a graph or network as an electric circuit in accordance with embodiments of the present invention.

FIG. 1 is a diagram 10 that illustrates the concept of modeling a graph or network 11 as an electric circuit 12 in accordance with embodiments of the present invention. Specifically, FIG. 1 shows conceptual current 14 flowing from left to right through nodes of the network or graph 11, thereby building a voltage difference. The graph 11 shows exemplary nodes 16 and demonstrates a physical concept of node connectivity: nodes inside a community (G1 and G2) are densely connected, thus their voltages tend to be close, while nodes in different communities (G1 and G2) tend to have greater voltage differences. Further, FIG. 1 illustrates this concept through the three resistors 18, where the largest of the three symbols 18 indicates a higher resistance and a voltage gap. Accordingly, a relatively large voltage gap 20 is shown occurring about halfway between the two communities G1 and G2. Such gaps 12 occur because edges are sparse and the local resistance is large.

More specifically, operation of embodiments of the present invention may be illustrated by the problem of dividing the graph 11 into two communities, G1 and G2. While a two-community graph 11 is used here for purposes of illustration, the present method may be extended to more general n-community graphs. The graph 11 described by the equation G=(V, E) is shown wherein nodes A and B are known to belong to the two different communities, G1 and G2. The edges in the graph 11 may be conceptualized as resistors with the same resistance, and a theoretical battery 22 may connect nodes A and B such that nodes A and B have fixed voltages, such as one and zero. Having thus conceptualized the graph 11, it can be viewed as an electric circuit 12 with current 14 flowing through each edge (resistor). Therefore, by solving Kirchhoff equations we can obtain the theoretical voltage value of each node, which of course should lie between zero and one based on the given dynamic.

In accordance with the above, from a node's voltage value it may be possible to judge whether it belongs to G1 or G2, thus discerning the two communities in the network or graph 11. More specifically, any given node in the graph 11 may belong to G1 if its voltage is greater than a certain threshold, such as five-tenths (0.5), and that the node may belong to G2 if its voltage is less than that threshold.

Figure 2:
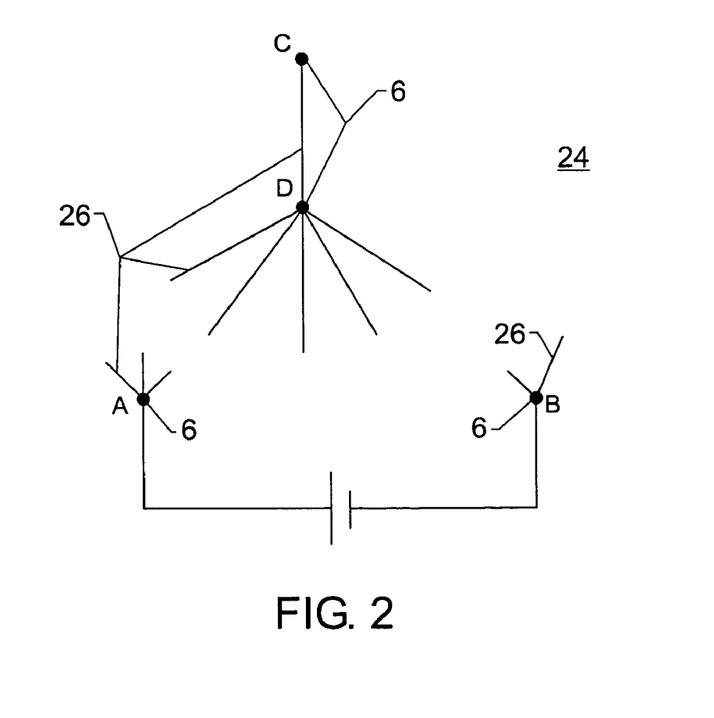
FIG. 2 is a diagram illustrating the connectivity of nodes in accordance with embodiments of the present invention.

FIG. 2 is a diagram 24 illustrating the connectivity of nodes in accordance with embodiments of the present invention. Specifically, FIG. 2 shows nodes A, B, C, and D of a plurality of nodes that may exist in the graph 11. Additionally, FIG. 2 illustrates exemplary edges 26 that interconnect these nodes. The exemplary edges 26 are meant to show that many edges 26 may exist between the plurality of nodes. However, only one actual edge 26 is completely shown, the edge between nodes C and D. In a very simplified case the fully illustrated edge CD is the only edge and node C has only one neighbor D, so logically C should belong to the same community as D. The present method applies to this case in that no current can flow through the edge CD, and thus the two endpoints may have the same voltage. Accordingly, nodes C and D may be defined to belong to the same community.

In a second example, node C connects to two neighbors, nodes D and E. Because the edges CD and CE have the same resistance, we must have $V_C=(V_D+V_E)/2$. Hence, if node D and node E belong to the same community (i.e., $V_D$ and $V_E$ both lie above or below the threshold), then $V_C$ lying between $V_D$ and $V_E$ should be above or below the threshold as well, therefore belonging to the same community as nodes D and E. On the other hand, if node D and node E belong to different communities, then it may be comparatively hard to tell which community node C belongs to ($V_C$ might be near the threshold). When a node has connections with more than one community, ambiguity may arise.

A general case may further illustrate the present technique or method. In the general case, node C connects to n neighbors, $D_1, \ldots, D_n$. The Kirchhoff equations indicate that the total current flowing into node C should sum up to zero, i.e., $$\sum_{i=1}^{n} I_i = \sum_{i=1}^{n} \frac{V_{Di} - V_c}{R} = 0, \tag{1}$$

where $I_i$ is the current flowing from node $D_i$ to node C. Thus $$Vc = \frac{1}{n} \sum_{i=1}^{n} V_{Di}. \tag{2}$$

That is, the voltage of a node 6 is the average of its neighbors. If the majority of node C's neighbors belong to a community which has voltage greater than the threshold, then $V_C$ tends to exceed the threshold as well, hence the present method tends to classify node C into that community. It should be noted that the present method may be easily extended to weighted graphs by simply setting each edge's conductivity proportional to its weight:

$$R_{ij} = w_{ij}^{-1}. \tag{3}$$

Accordingly, the average represented in Equation (2) above becomes a weighted average.

Following Equation (2), the Kirchhoff equations of a n-node circuit can be written as:

$$V_1 = 1, \tag{4}$$

$$V_2 = 0, \tag{5}$$

$$V_i = \frac{1}{k_i} \sum_{(i,j) \in E} V_j = \frac{1}{k_i} \sum_{j \in G} V_j a_{ij} \text{ for } i = 3, \ldots, n, \tag{6}$$

where $k_i$, is the degree of node i and $a_{ij}$ is the adjacency matrix of the graph. Without loss of generality, the nodes are labeled such that the theoretical battery 22 is attached to nodes 1 and 2, which may be referred to as poles. Equations (4) and (5) reflect accordance with this format based on the fixed voltages discussed previously.

Equation (6) is a set of linear equations of n−2 variables $V_3, \ldots, V_n$ that can be put into a more symmetrical form:

$$V_i = \frac{1}{k_i} \sum_{j=3}^{n} V_j a_{ij} + \frac{1}{k_i} a_{i1} \text{ for } i = 3, \ldots, n. \tag{7}$$

$$V = \begin{pmatrix} V_3 \\ \vdots \\ V_n \end{pmatrix}, B = \begin{pmatrix} \frac{a_{33}}{k_3} & \cdots & \frac{a_{3n}}{k_3} \\ \vdots & & \vdots \\ \frac{a_{n3}}{k_n} & \cdots & \frac{a_{nn}}{k_n} \end{pmatrix}, C = \begin{pmatrix} \frac{a_{31}}{k_3} \\ \vdots \\ \frac{a_{n1}}{k_n} \end{pmatrix}, \tag{8}$$

then the Kirchhoff equations can be further put into a matrix form:

$$V = BV + C, \tag{9}$$

which has the unique solution:

$$V = (I-B)^{-1}C. \tag{10}$$

Generally, it may take O(n3) time to solve a set of equations like Equation (10). However, embodiments of the present disclosure may reduce the time down to O(V+E). Before specific details of this method are disclosed, it should be noted that if the following definition is applied $$L = \begin{pmatrix} k_3 & -a_{34} & \cdots & -a_{3n} \\ -a_{43} & k_4 & \cdots & -a_{4n} \\ \cdots & & & \cdots \\ -a_{n3} & -a_{n4} & \cdots & k_n \end{pmatrix}, D = \begin{pmatrix} a_{31} \\ \vdots \\ a_{n1} \end{pmatrix}, \tag{11}$$

then the Kirchhoff equations can also be written as $$LV = D, \tag{12}$$

which has the unique solution $$V = L^{-1}D. \tag{13}$$

L is the Laplacian matrix of the subgraph of G containing nodes $3, \ldots, n$. The spectral partitioning method partitions the graph based on the eigenvector of the second smallest eigenvalue of G's Laplacian matrix.

Turning now to solving the Kirchhoff equations in linear time, the following values are set in O(V) time: $V_1 = 1$, $V_2 = \ldots = V_n = 0$. Starting from node 3, each node's voltage is consecutively updated to the average voltage of its neighbors, according to Equation (2). The updating process ends when the last node n is reached, which may be referred to as a round. Because any node i has $k_i$ neighbors, one has to spend an amount of $O(k_i)$ time calculating its neighbor average, thus the total time spent in one round is $$O\left(\sum_{i=3}^{n} k_i\right) = O(E).$$

After repeating the updating process for a finite number of rounds, an approximate solution is reached that is within a certain precision, which does not depend on the graph size n but only depends on the number of iteration rounds. In other words, to obtain a certain precision (e.g. one percent) one only needs to repeat a certain number of rounds (e.g. one-hundred rounds), no matter how large the graph is, so the total running time is always O(V+E).

To illustrate conceptually the fast convergence of the algorithm, Equation (10) may be expanded into a series:

$$V = \sum_{m=0}^{\infty} B^m C. \tag{14}$$

Now if the following is defined $$f(V) = BV + C \tag{15}$$

then $$f^{(r)}(V) = \sum_{m=0}^{r-1} B^m C + B^r C. \tag{16}$$

As r goes to zero (r→0) the remainder goes to zero (remainder→0). Thus, the iteration algorithm amounts to a simple cutoff of the power series. The convergence speed is determined by the matrix norm $\|B\|$ which is usually insensitive to dim(B)=O(V).

Figure 3:
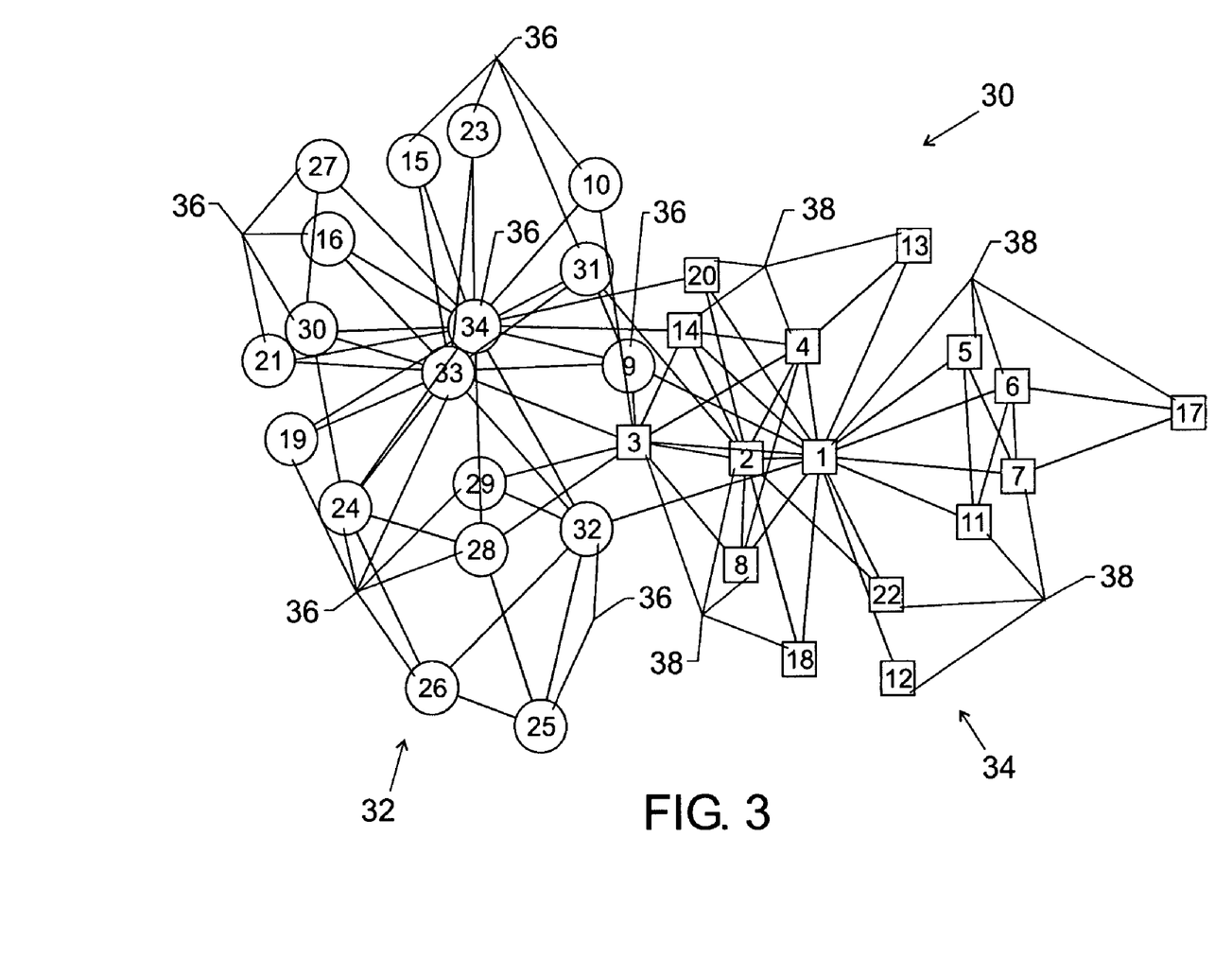
FIG. 3 is a diagram of a two-community network in accordance with embodiments of the present invention.

FIG. 3 is a diagram of a two-community network 30 in accordance with embodiments of the present invention. Specifically, FIG. 3 may illustrate friendship network data from a group of individuals such as a social club or the like. The network or graph 30 includes two communities 32, 34 of roughly equal size. The respective nodes 36, 38 in each community 32, 34 are distinguished by square and round shapes. More precisely, each community's nodes 36, 38 are respectively shown as being enclosed by circles and squares.

Figure 4:
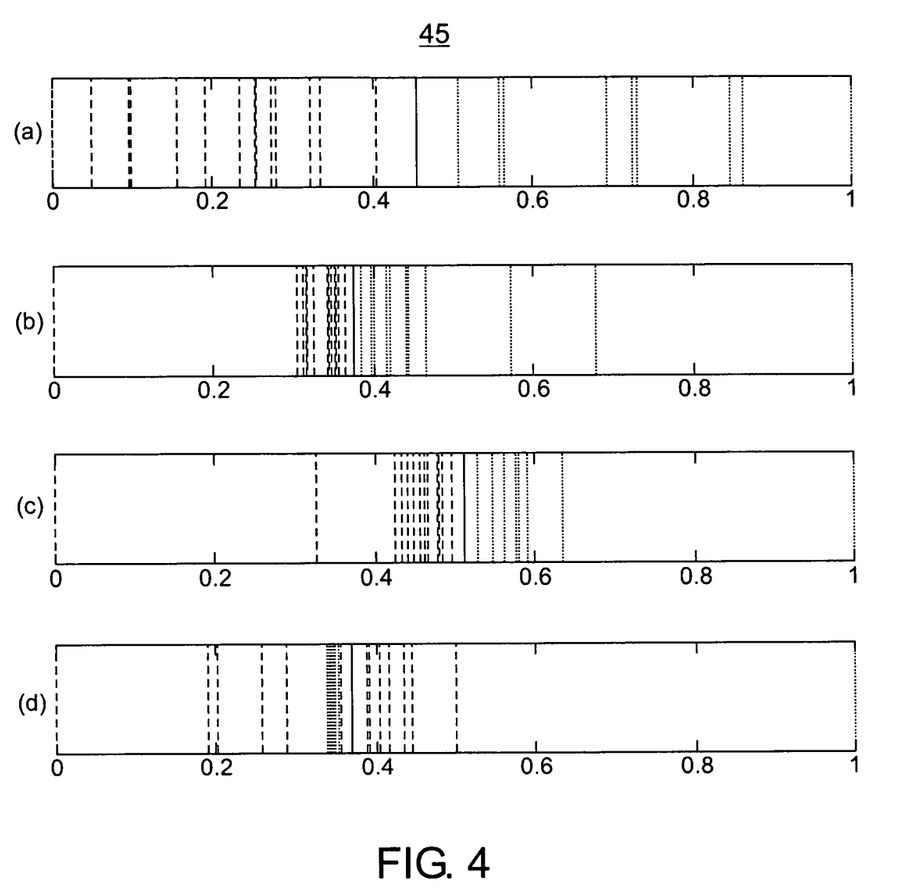
FIG. 4 illustrates voltage spectrums in accordance with embodiments of the present invention.

FIG. 4 illustrates voltage spectrums in accordance with embodiments of the present invention. The voltage spectrums are generally referred to by the reference number 45. Specifically, FIG. 4 illustrates voltage spectrums 45 resulting from the linear time algorithm as applied to the friendship network data illustrated in FIG. 3. The algorithm runs one-hundred iteration rounds to reach the precision <0.01. Specifically, FIG. 4 shows four panels (a-d) which illustrate the results of the battery being hooked up to nodes 1 and 35 in panel (a), 16 and 17 in panel (b), 12 and 26 in panel (c), and 32 and 33 in panel (d). In FIG. 4, a node is represented as a vertical line at the abscissa equal to its voltage, and is either dashed if it belongs to the first community, or dotted if it belongs to the second community.

Accordingly, based on the reasoning behind the present algorithm, the dashed lines and the dotted lines, in the above-mentioned graphs, should separate at the two ends. As can be seen in FIG. 4, this is indeed the case for the first three panels (a-c), when the external voltage is added between a pair of nodes lying in different communities. Each graph is cut into two halves at the biggest gap near the middle (tolerance=0.2), which is marked with a solid line. However, also illustrated, in the last panel (d), is how the algorithm fails when the poles lie in the same community.

Two additional issues may remain after obtaining the complete voltage spectrum as discussed above. First, the matter of picking the two poles such that they lie in different communities and, second, determining what threshold should be used to separate the two communities. The first issue is difficult because no prior information is known about the graph and the problem must be solved in linear time. Two possible solutions to the first issue are described in further detail below, a heuristic and a statistical method. The second issue is also discussed in further detail below.

Regarding the first issue of picking the two poles in different communities, average distances between nodes, where distance is the number of edges between nodes, may be different depending on the community in which the nodes reside. Because nodes are densely connected inside a community, the average distance between two nodes chosen from one community is generally shorter than the average distance between two nodes chosen from different communities. Thus, there is a high probability that two far apart nodes sit in different communities, qualifying for the poles.

Figure 5:
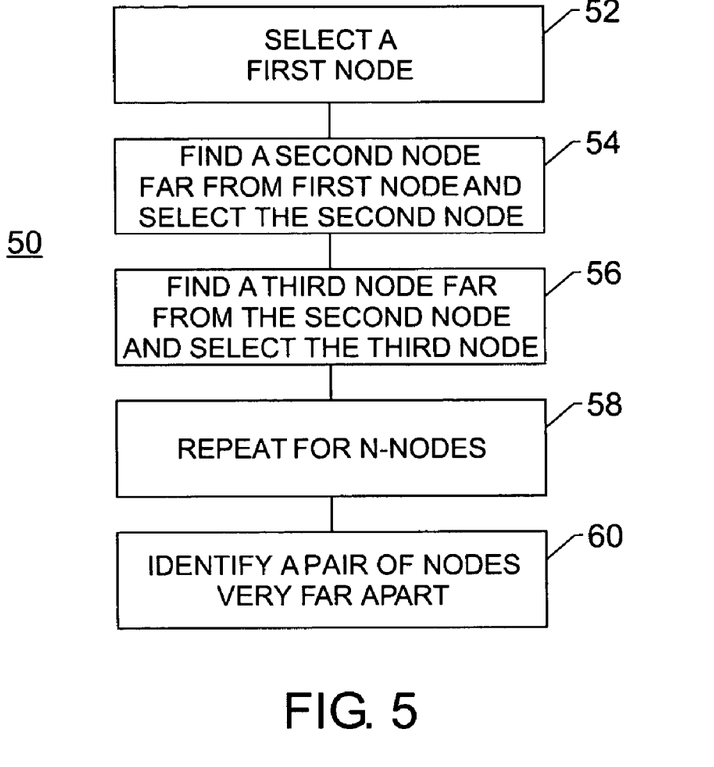
FIG. 5 is a block diagram illustrating a method of finding distant nodes in accordance with embodiments of the present invention.

FIG. 5 is a block diagram illustrating a method of finding distant nodes in accordance with embodiments of the present invention. The block diagram is generally referred to by the reference number 50. Specifically, FIG. 5 illustrates a linear-time method for finding a far apart pair of nodes. First a node is randomly picked (block 52). Then, using a simple breadth-first search taking time O(V+E), the node farthest from the randomly chosen node is found (block 54). A breadth-first search is a graph search algorithm which tries all one-step extensions of current paths (e.g. edges) before trying larger extensions. If more than one node qualifies, any of the qualifying nodes may be chosen (block 54). Next, another breadth-first search is employed to find the node farthest from the second node (block 56), and so on (block 58). After a few steps, this procedure will identify a pair of nodes very far apart (block 60).

A diameter (a number of edges between nodes) of the graph may be defined by the largest distance of all pairs. For example, the graph illustrated by FIG. 3 has a diameter of five. In other words, all pairs of nodes with this distance apart indeed belong to different communities. One example wherein the battery is hooked up to nodes 16 and 17 is shown in FIG. 4(*b*).

Figure 6:
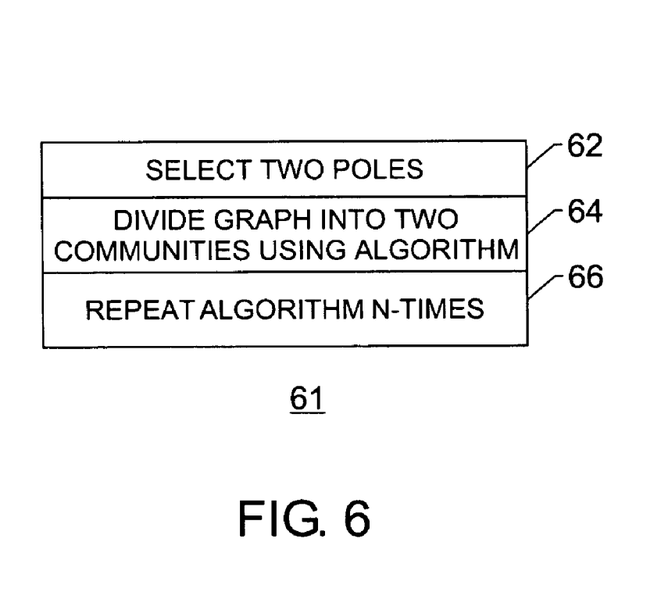
FIG. 6 is a block diagram illustrating a method of pole selection in accordance with embodiments of the present invention.

FIG. 6 is a block diagram illustrating a method of pole selection in accordance with embodiments of the present invention. The pole selection block diagram is generally referred to by the reference number 61. Specifically, FIG. 6 illustrates a statistical method that can be used to avoid the issue of picking the two poles in different communities instead of solving the issue. For example, two poles may be randomly picked (block 62), the algorithm may be applied to divide the graph into two communities (block 64), and then the algorithm may be repeated many times (block 66) (the total time is still O(V+E)). Accordingly, about one half of the results would give correct results because the poles would happen to lie in different communities, while the other half would give incorrect results. However, the probability that the randomly chosen poles lie in different communities can be made higher than half by improving the pole-picking method. This improvement can be made by only choosing nodes that are not neighbors (block 62) (i.e., there is no edge between them). Using this method, the probability that the randomly chosen poles lie in different communities becomes higher than a half, which suggests that the majority of the results is correct. Thus a majority vote (i.e. the frequency of appearance in a community) may be used to determine the communities.

The statistical method addressing the selection of poles has been tested against the study data illustrated in FIG. 3. Two nodes among those whose distance was greater than or equal to two ($\geq 2$) were randomly chosen from the data. Next, the algorithm was run to define two communities and the process was repeated fifty times to obtain one-hundred groups altogether, among which fifty groups contained node 16 (node 16 was arbitrarily chosen for purposes of illustration). Next, the number of instances that each particular node appeared in the same group as node 16 were counted, the maximal possible value being fifty and the minimal possible value being zero.

Figure 7:
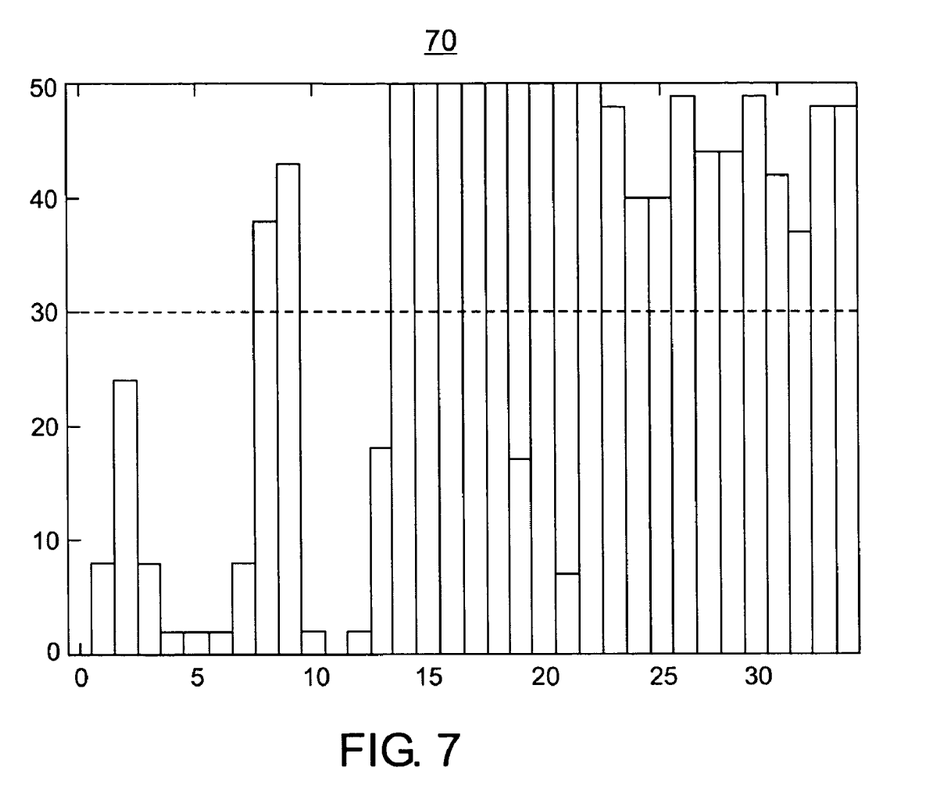
FIG. 7 is a bar graph illustrating test results in accordance with embodiments of the present invention.

FIG. 7 is a bar graph illustrating test results in accordance with embodiments of the present invention. The bar graph is generally referred to by the reference number Specifically, FIG. 7 illustrates the results of applying the statistical method discussed above to the study data illustrated in FIG. 3. More particularly, the graph shows the number of times a node appears in the same group as node 16 by graphing the groups on the Y-axis and the nodes on the X-axis. In this example, there are altogether fifty groups containing node 16.

The following discussion relates to the second question regarding what threshold to use in order to separate the two communities. Because edges are sparser between two communities, the local resistivity should be large compared to the local resistivity within the two communities. Thus the voltage drops primarily at the junction between communities, as best illustrated in FIG. 1. This suggests placing the threshold at the largest voltage gap near the middle, noting that the global largest gap often appears at the two ends of the voltage spectrum as illustrated by FIGS. 4(*b*) and (*c*). While this is one option, it may not make sense to cut there at all because it may divide the graph into two extremely asymmetrical communities, one of which has only one or two nodes.

To be more definitive, the term "near the middle," used above, must be further defined. Accordingly, two cases are herein distinguished. First, there is the case of cutting the graph into exactly two equal-sized communities. And, second, there is the case of finding communities of roughly the same size, which for the example data implies approximately seventeen nodes ($\approx 34/2=17$) in each community.

Figure 8:
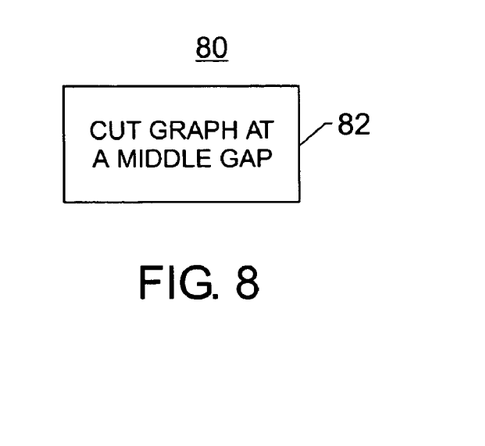
FIG. 8 is a block diagram illustrating a method in accordance with embodiments of the present invention.

FIG. 8 is a block diagram illustrating a method in accordance with embodiments of the present invention. The method diagram is generally referred to by the reference number 80. Specifically, FIG. 8 illustrates a method of dividing a graph, such as those in FIG. 4, into exactly two equal-sized communities. In this first case, the solution may be simply having an operator cut the graph at the proper middle gap (block 82). In this case, the median-selection problem can be done in O(V) time by a good selection algorithm.

Figure 9:
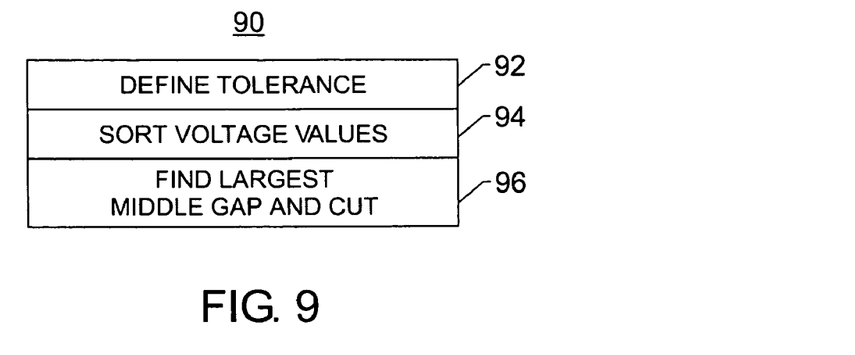
FIG. 9 is a block diagram illustrating a method of dividing a graph in accordance with embodiments of the present invention.

FIG. 9 is a block diagram illustrating a method of dividing a graph in accordance with embodiments of the present invention. The graph dividing method is generally referred to by the reference number 90. Specifically, FIG. 9 illustrates the case of finding communities of roughly the same size. In this second case, the example data implies seventeen nodes each. In this case, a tolerance may be defined to describe the range of allowed community sizes (block 92). For example, a tolerance of twenty percent means the search is only for communities of the size seventeen plus or minus twenty percent (17±20%), which is communities of the size fourteen and twenty-one (14, 21). First the voltage values are sorted (block 94). Then the largest gap among the middle seven (21−14=7) gaps is found and the graph is cut at this gap (block 96). Note that the sort can be done in O(V) time by using a standard linear time sort (e.g. counting sort), which applies to the present problem since the voltage can only take a finite number of values (e.g. 101 choices for precision 0.01). Also note that the solid lines in FIG. 4 were determined using this procedure. However, it should be emphasized that this method may not always work.

Figure 10:
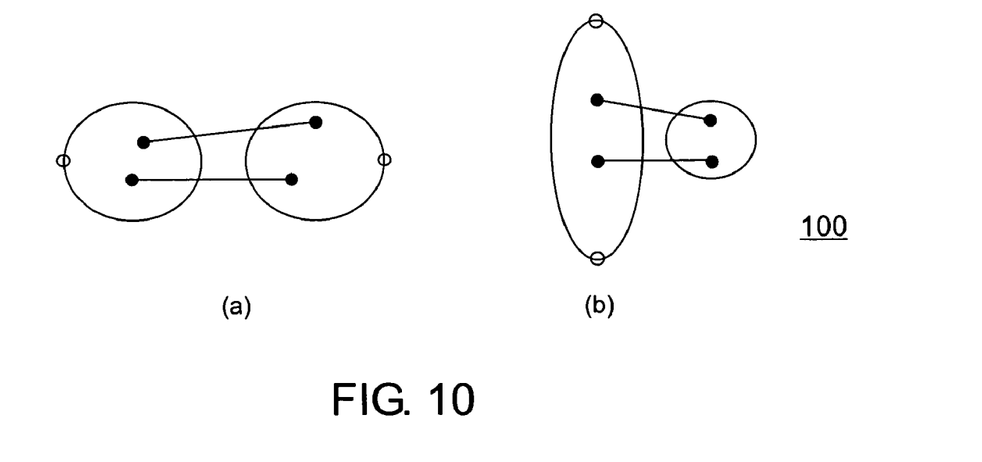
FIG. 10 is a diagram illustrating two separate two-community networks or graphs in accordance with embodiments of the present invention.

FIG. 10 is a diagram illustrating two separate two-community networks or graphs in accordance with embodiments of the present invention. The separate community diagram is generally referred to by the reference number 100. Specifically, the purpose of FIG. 10 is to illustrate that the above-mentioned method for finding communities of roughly the same size does not always work. Accordingly, FIG. 10 shows two graphs, a graph labeled (a) and a graph labeled (b). In the graph labeled (a), the largest distance happens across two communities, while in the graph labeled (b) the largest distance happens inside a community. Thus, FIG. 10 illustrates that the largest distance can sometimes happen inside a community.

The presently disclosed method or algorithm may be extended to n-community graphs. For example, the algorithm may be employed using data about clearly defined communities such as NCAA football. In NCAA college football, there are a total of one-hundred-fifteen teams which are divided into thirteen "conferences" or communities containing around eight to twelve teams each. The results of using the present algorithm on this data are herein presented to further illustrate aspects of the present method. Specifically, the results discussed below demonstrate that the presently disclosed algorithm is capable of defining all of the "conferences" or communities in the data.

As shown in FIG. 3, two poles whose distance is greater than or equal to two are randomly chosen, then the presently disclosed algorithm is applied to get the voltage spectrum. Additionally, it should be noted that the probability that two poles belong to the same community decreases as the number of communities increases, roughly in the manner 1/m, where m is the number of communities. Next the tolerance was set to be fifty percent (0.5), meaning that a search is performed for only communities whose sizes are in the range one-hundred-fifteen divided by thirteen plus or minus fifty percent (115/13±50%), or roughly between four and thirteen.

Figure 11:
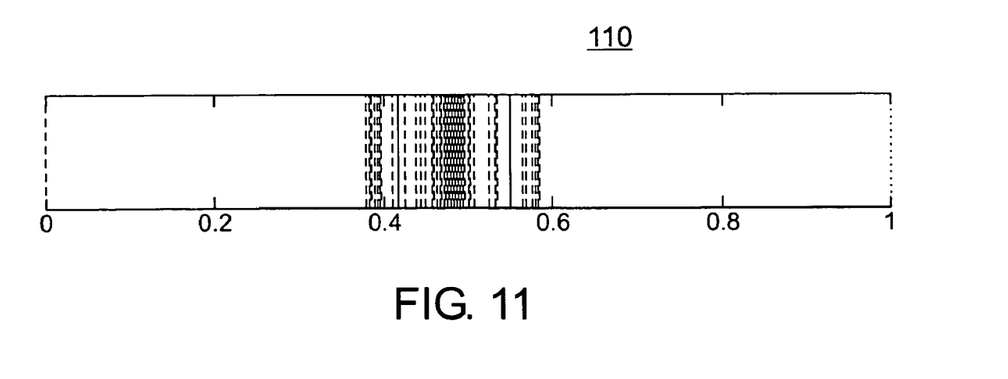
FIG. 11 is a voltage spectrum in accordance with embodiments of the present invention.

FIG. 11 is a voltage spectrum in accordance with embodiments of the present invention. The voltage spectrum is generally referred to by the reference number 110. Specifically, FIG. 11 is an example voltage spectrum obtained when the theoretical battery was hooked up to node 51 (Washington) and node 88 (Tulsa). Further, FIG. 11 illustrates the two groups, which are identified using solid lines. To be more precise regarding obtaining such information, all one-hundred-fifteen voltage values are sorted in an increasing order and labeled as $0=V_1 \leq V_2 \leq \ldots \leq V_{115}=1$. Next, the gaps $V_6-V_5, V_7-V_6, \ldots, V_{14}-V_{13}$ are measured one by one to pick out the largest one, say $V_9-V_8$, which indicates a group of nodes having voltages $V_1, \ldots, V_8$. Similarly, a group of nodes at the $V_{115}$ end is obtained. The two groups thus found are both candidates for the thirteen communities that are to be defined.

In order to obtain the results referenced below, the process was repeated fifty times to collect one-hundred candidates. Then, as was done in the previous two-community graph example, majority voting was applied using the numbers of groups containing a specific node. While the specific node could have been chosen rather freely, the one that appeared most frequently in the one-hundred groups was chosen in order to use the most information (frequency test takes O(V) time). After the first community was found in this manner, a second node was chosen which appeared most frequently, and a majority vote was applied to all groups containing that node in order to find the second community. This procedure was repeated thirteen times and thus all thirteen communities were defined.

Figure 12:
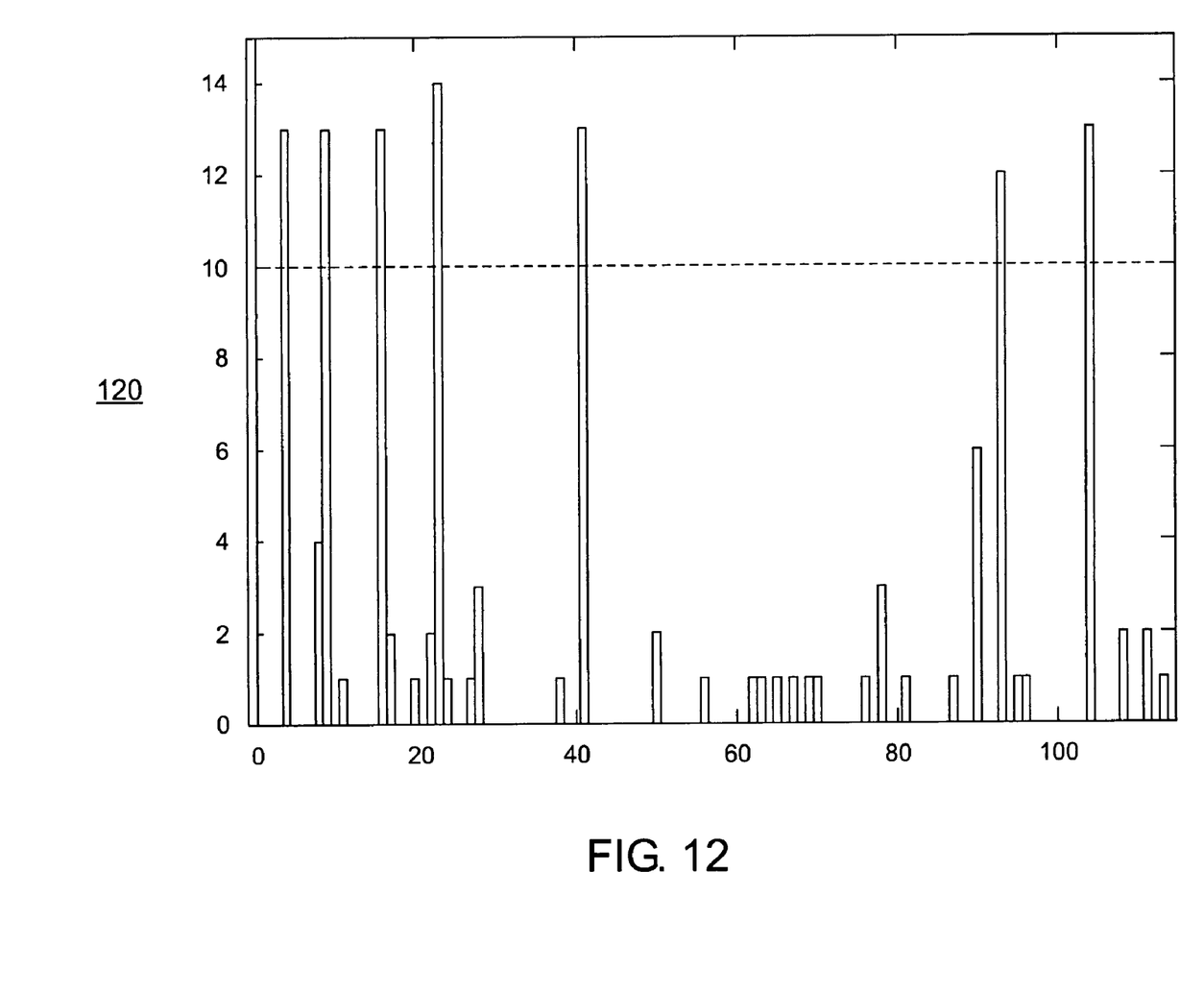
FIG. 12 is a bar graph illustrating test results in accordance with embodiments of the present invention.

FIG. 12 is a bar graph illustrating test results in accordance with embodiments of the present invention. The bar graph is generally referred to by the reference number 120. Further, FIG. 12 is similar to the graph illustrated by FIG. 7 but the results displayed are based on a study of U.S. college football data. Specifically, FIG. 12 is an example graph that illustrates the number of times a node appears in the same group as node 0 (Brigham Young). Altogether, there are fifteen groups containing node 0. However, only eight nodes lie above the threshold designated by the dashed line in FIG. 12. These eight nodes include the exact members of the Mountain West conference (node 0—Brigham Young, node 4—New Mexico, node 9—San Diego, node 16—Wyoming, node 23—Utah, node 41—Colorado State, node 93—Air Force, and node 104—Nevada Las Vegas).

Further, additional time may be saved if it is only necessary to find the community of a given node instead of all communities. Accordingly, instead of randomly picking two nodes at a time, the given node is fixed as one pole (block 62), and a second pole is chosen to be another random node that is at least a distance of two away from the first one. The remaining steps (setting the tolerance 92, calculating voltages 94, cutting through the biggest gap 96, etc.), which are discussed above, remain the same. By following the above steps, acquisition of a group containing the given node is guaranteed in each round. Accordingly, the total number of rounds can be further reduced from, for example, fifty to twenty, which provides twenty candidates, sufficient for the majority vote.

The presently disclosed method has also been tested against actual email data, which was collected from a network comprising three-hundred-ninety-six nodes. In setting up the system for testing, if two nodes exchanged more than thirty emails per month, the two nodes were joined with an edge. As an example, the method was used to find out the closest colleagues of a node referred to herein as "J". Accordingly, the results show a total number of twenty nodes that lie above the threshold. Further, this result was compared with the communities extracted from the email data and it was observable that these nodes belong to the same laboratory as node J.

It should be noted that distance information is not sufficient to detect the community of a given node. In other words, nodes cannot simply be picked out within a radius d from the given node and be said to form a community for three reasons. First, two nodes separated by a short distance need not to be in the same community. In our last example regarding actual email data, fifty-seven nodes have distance greater than or equal to two ($\leq 2$) from node J, among which only twenty-seven belong to node J's location. Second, for a small-world network, even the number of second neighbors or third neighbors can be very large. As can be seen in the email example, node J has one-hundred-fifty-seven neighbors within a distance of three, which is already about forty percent of the total size. Third, two nodes with a large distance apart can still be in the same community. For example, node "JS" is among one of the twenty nodes found by the presently disclosed algorithm but has a distance of three away from node J, which is a quite large distance.

Regarding other interpretations of voltage, in the two-community examples discussed above, the voltage is regarded as an index serving to indicate in which community a node belongs. Its absolute value has no special meaning because the range can freely be changed from zero and one (0, 1) to any other range. Despite its clear physical meaning, the theoretical voltage can be a weight function measuring to what extent the node belongs to a community. For example, if we set the voltage range to negative one and one (−1, 1), it can then be said that a node "strongly" belongs to the negative one (−1) community if its voltage is negative nine-tenths (−0.9), or a node "weakly" belongs to the one (1) community if its voltage is two-tenths (0.2), etc.

This second interpretation of voltage suggests other possible choices of weight functions. The voltage, being a scalar, can only separate two communities because the real line only has two directions. However, if the weight function is generalized to a vector, extra dimensions can be achieved to separate more communities. Accordingly, an example of the use of extra dimensions to separate communities is discussed below.

Figure 13:
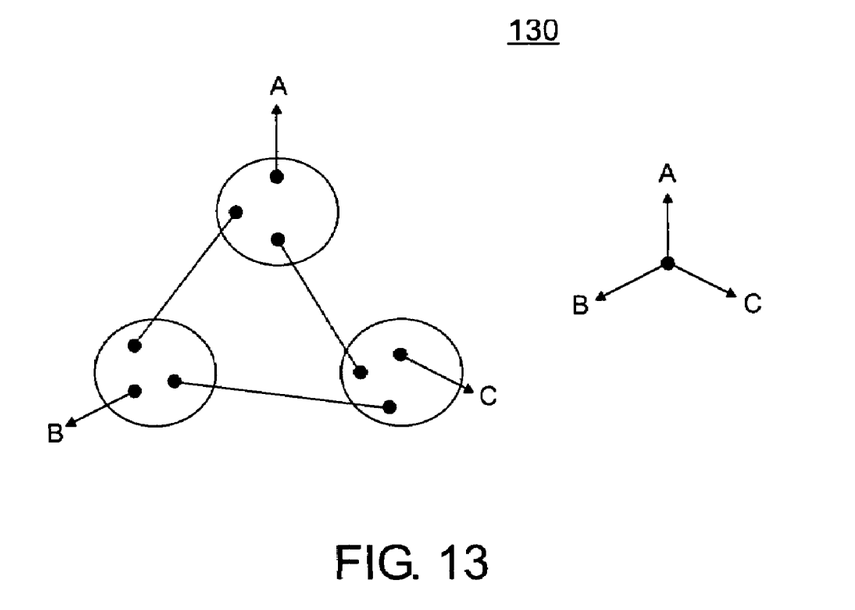
FIG. 13 is a diagram illustrating a graph made up of three communities in accordance with embodiments of the present invention.

FIG. 13 is a diagram illustrating a graph made up of three communities in accordance with embodiments of the present invention. The graph is generally referred to by the reference number 130. This figure further demonstrates aspects of the present method and serves as an example of the use of extra dimensions to separate communities. Specifically, FIG. 13 illustrates three poles dispersed in three different communities. Further, FIG. 13 illustrates each pole having an assigned unit-length vector weight such that the angle between any two of them is exactly one-hundred twenty degrees. These three weight vectors may be referred to as vectors A, B, and C. These vectors have the properties A+B=−C, A+C=−B, and B+C=−A. Thus, for example, if a node is strongly connected to communities A and B but not to C, then it may be appropriate to separate the node from community C (because A+B=−C). Also, if a node connects to all three communities, it could be that the relation A+B+C=0 indeed reflects the obscurity of the node's belonging.

After the vector weights of the three poles are fixed, the presently disclosed method is continued by solving the Kirchhoff equations with vector sums in the place of the sums in Equation 6. Once the vector weights of all nodes are solved, each node's pointing direction in the two-dimensional plane is indicative of the community to which that node belongs. For example, if a node's vector weight is pointing basically upward then it can be said that it belongs to community A. Hence vector weights allow for the separation of three communities at a time.

Finally, an additional interpretation of voltage may be that when a unit voltage is applied between A and Z, making $V_A=1$ and $V_Z=0$, the voltage $V_X$ at any point $X \neq A,Z$ represents the probability that a walker starting from X will return to A before reaching Z. Additionally, there is a probabilistic interpretation of current.

In embodiments of the present invention it may be desirable to specify a number of communities to divide a graph into (as illustrated by FIG. 9). A solution may be to first divide the graph into two big communities and then break the two communities into smaller ones by recursively applying the previously described method. The statistical method of attaching the battery to random sites over the graph may not be optimal when the graph is not "divisible" enough. This may happen whenever the graph itself is a big community, and thus is not divisible, or when the graph can be divided into two parts in many ways ("too divisible"), each having about the same contribution to the majority vote.

Figure 14:
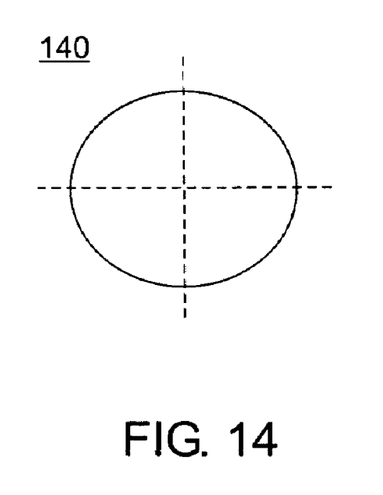
FIGS. 14 and 15 are graphs illustrating connectivity in accordance with embodiments of the present invention.
Figure 15:
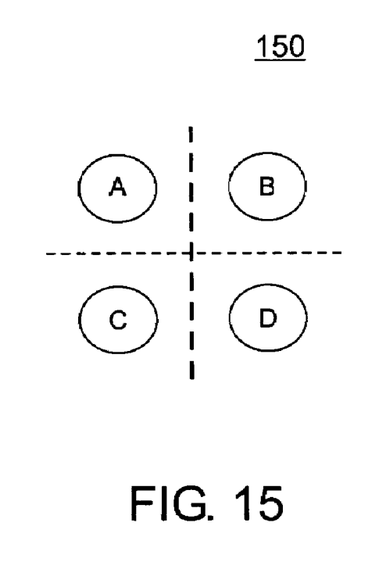

FIGS. 14 and 15 are graphs illustrating connectivity in accordance with embodiments of the present invention. The graphs in FIG. 14 and FIG. 15 are generally referred to by the reference numbers 140 and 150 respectively. Specifically, FIG. 14 illustrates a graph that is densely connected everywhere and FIG. 15 illustrates a graph that contains four communities of approximately equal size (inter-community edges not shown.) In order to explain why the present statistical method works poorly in the second case (FIG. 15), note that the graph in FIG. 15 is composed of four communities, A, B, C and D. Supposing AB, AC, BD and CD are loosely connected by some inter community edges but not AD and BC, if two poles are chosen separately in A and B, then the present algorithm would tend to divide the graph into two parts: AC and BD. However, there is a roughly equal chance to choose two poles in A and C, which would imply the division AB and CD. Thus the present statistical method becomes puzzled as to where to cut.

Performance of embodiments of the present invention may be improved if the relevant graph is unambiguous. In the previous example, any algorithm may introduce uncertainty about whether to cut the graph into AB/CD or AC/BD.

Embodiments of the present invention may assist in dealing with complex graphs. In one embodiment, a statistical method may work well when the graph is "too divisible." Additionally, different weight functions and different definitions of average (other than the one in Eq. (6)) may be utilized. Also, other information in the complete voltage spectrum not fully utilized may be exploited. For example, nodes belonging to the same community usually concentrate closely in the spectrum, and yet the voltages between the two green lines in FIG. 11 were simply discarded but this information may be utilized. Further, the result of a majority vote may be used to evaluate the correctness of the partition.

Figure 16:
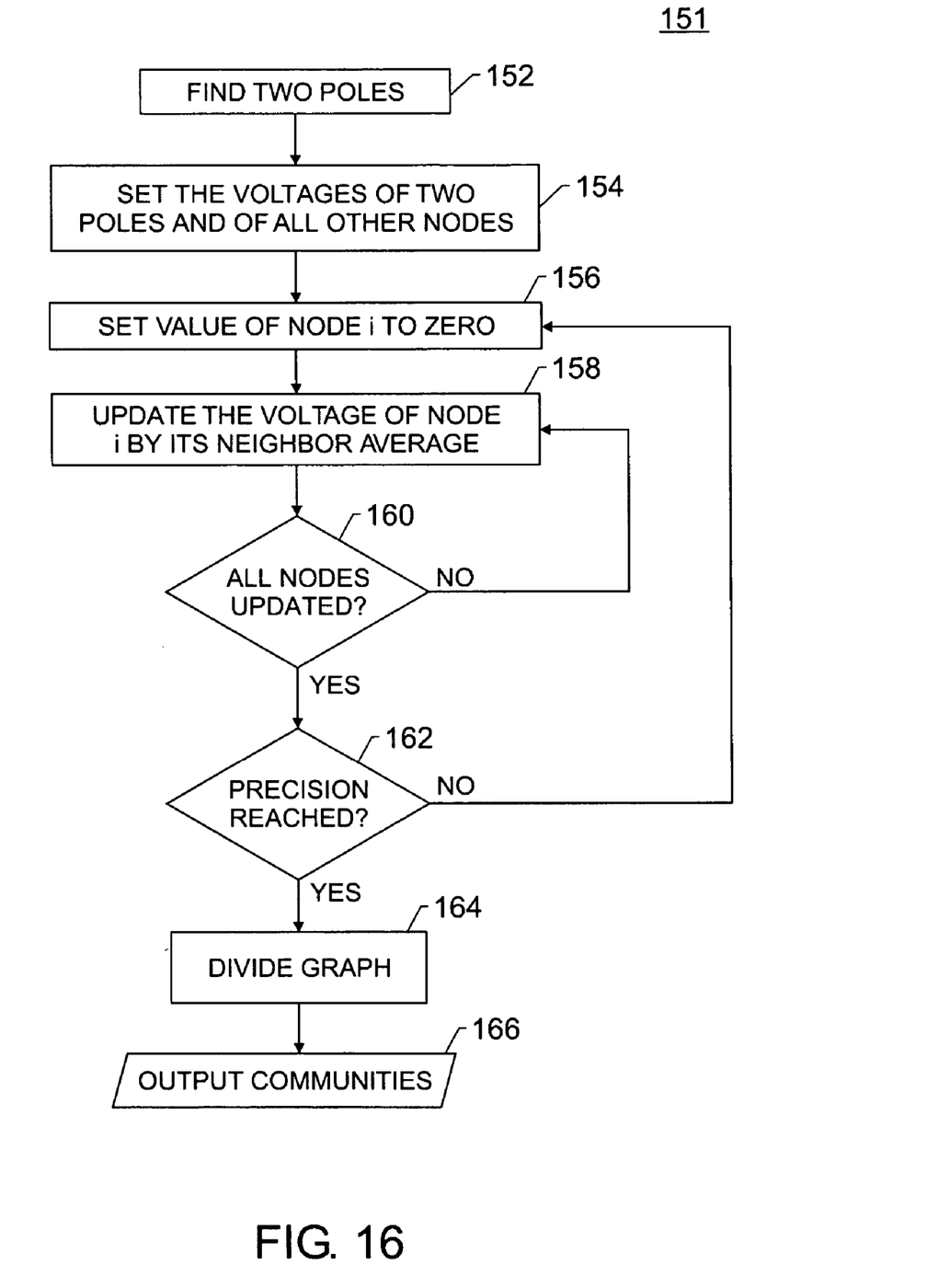
FIG. 16 is a block diagram illustrating a method in accordance with embodiments of the present invention.

FIG. 16 is a block diagram illustrating a method in accordance with embodiments of the present invention. The block diagram is generally referred to by the reference number 151. Specifically, FIG. 16 illustrates a generalized summary view of the presently disclosed method. Block 152 represents finding two nodes (e.g. node 1 and node 2) to operate as poles (see FIGS. 5 and 6). Block 154 represents setting theoretical voltages of the two poles (e.g. node 1 to a voltage of one and node 2 to a voltage of zero) and the theoretical voltages of all other nodes (e.g. 3, 4, . . . , n to zero). Block 156 represents setting the value of node i to zero. Block 158 represents updating the voltage of node i by its neighbor average. Block 160 represents a decision regarding whether all the nodes are updated (e.g. whether i=n). If the answer to block 160 is "no" the method proceeds to block 158, otherwise the method continues to block 162. Block 162 is a second decision block that represents a decision regarding whether a precision has been reached. If the answer to block 162 is "no," the method proceeds to block 156, otherwise the method continues to block 164. Block 164 represents dividing the graph (see FIG. 8 and FIG. 9). Finally, block 166 represents outputting the communities. For example, block 166 may output the communities found by dividing a graph at the largest two gaps at the two ends of a voltage spectrum.

While the invention may be susceptible to various modifications and alternative forms, specific embodiments have been shown by way of example in the drawings and will be described in detail herein. However, it should be understood that the invention is not intended to be limited to the particular forms disclosed. Rather, the invention is to cover all modifications, equivalents and alternatives falling within the spirit and scope of the invention as defined by the following appended claims.

What is claimed is:

1. A method of discovering communities in a network of nodes, the method comprising operating a processor to perform operations comprising:
   selecting ones of the nodes of the network;
   assigning a respective weight value to each of the selected nodes;
   for each of the unselected ones of the nodes, determining a respective weight value that is equal to an average of the weight values of all of the neighboring ones of the nodes that are connected to the node by a respective edge; and
   dividing the network into communities based on an analysis of a distribution of the weight values;
   wherein the selecting, the assigning, the determining, and the dividing are performed by a computer.

2. The method of claim 1, wherein the assigning comprises assigning respective unit-length vector weights to the selected nodes.

3. The method of claim 1, wherein the determining comprises solving modified Kirchhoff equations for vector sums.

4. The method of claim 1, wherein the selecting comprises selecting a first one of the nodes and selecting a second one of the nodes based on a breadth-first search for a respective one of the nodes farthest from the first node.

5. The method of claim 1, wherein the selecting comprises selecting two of the nodes that are not neighboring nodes.

6. The method of claim 1, wherein the dividing comprises:
   defining a community size tolerance;
   sorting the nodes into a sequence ordered by their respective weight values;
   determining a set of near-the-middle gaps in the sorted weight values based on the community size tolerance; and
   selecting a largest gap from the set of near-the-middle gaps.

7. The method of claim 1, wherein the determining comprises iteratively ascertaining the weight values of the unselected ones of the nodes.

8. The method of claim 1, wherein the dividing is based on an analysis of a sequence of the nodes ordered by their respective weight values.

9. A method for discovering communities in networks, comprising:
   selecting a plurality of nodes from a network of nodes to serve as poles;
   setting weight values for the poles;
   applying a community-discovering algorithm based on the weight values;
   dividing the network into communities based on a result obtained from the community-discovering algorithm;
   establishing weight values for other nodes in the network;
   defining a community size tolerance;
   sorting the weight values of the poles and other nodes using a standard linear time sort;
   determining a set of near the middle gaps in the sorted weight values based on the community size tolerance; and
   selecting a largest gap from the set of near the middle gaps;
   wherein the selecting of the plurality of nodes, the setting, the applying, the dividing, the establishing, the defining, the sorting, the determining, and the selecting of the largest gap are performed by a computer.

10. The method of claim 1, further comprising:
    in each of multiple iterations,
       the selecting comprises selecting ones of the nodes that are not neighboring nodes,
       and performing the assigning,
       performing the determining, and
       performing the dividing to identify a respective division of the nodes into communities; and
    ascertaining the communities based on a majority vote analysis of the divisions of the nodes respectively identified in each of the iterations.

11. A system for discovering communities in a network on nodes, comprising
    a computer programmed to perform operations comprising:
       selecting ones of the nodes of the network;
       assigning a respective weight value to each of the selected nodes;
       for each of the unselected ones of the nodes, determining a respective weight value that is equal to an average of the weight values of all of the neighboring ones of the nodes that are connected to the node by a respective edge; and
       dividing the network into communities based on an analysis of a distribution of the weight values.

12. The system of claim 11, wherein in the selecting the computer is operable to perform operations comprising selecting a first one of the nodes and selecting a second one of the nodes based on a breadth-first search for a respective one of the nodes farthest from the first node.

13. A computer-readable medium having computer-readable program code embodied therein, the computer-readable program code adapted to be executed by a computer to implement a method of discovering communities in a network of nodes, the method comprising:
    selecting ones of the nodes of the network;
    assigning a respective weight value to each of the selected nodes;
    for each of the unselected ones of the nodes, determining a respective weight value that is equal to an average of the weight values of all of the neighboring ones of the nodes that are connected to the node by a respective edge; and
    dividing the network into communities based on an analysis of a distribution of the weight values.

* * * * *

UNITED STATES PATENT AND TRADEMARK OFFICE
CERTIFICATE OF CORRECTION

PATENT NO. : 7,644,146 B2  Page 1 of 1
APPLICATION NO. : 10/859578
DATED : January 5, 2010
INVENTOR(S) : Bernardo Huberman et al.

It is certified that error appears in the above-identified patent and that said Letters Patent is hereby corrected as shown below:

In column 14, line 24, in Claim 11, delete "comprising" and insert -- comprising: --, therefor.

Signed and Sealed this

Third Day of August, 2010

David J. Kappos
*Director of the United States Patent and Trademark Office*